United States Patent
Imai

(10) Patent No.: US 8,279,285 B2
(45) Date of Patent: Oct. 2, 2012

(54) HYBRID IMAGING WITH VISIBLE AND QUANTUM ENTANGLEMENT IMAGES

(75) Inventor: Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 12/760,033

(22) Filed: Apr. 14, 2010

(65) Prior Publication Data
US 2011/0254968 A1    Oct. 20, 2011

(51) Int. Cl.
*H04N 5/30* (2006.01)
*H04N 5/335* (2011.01)
*H04N 5/225* (2006.01)
*H04N 5/228* (2006.01)

(52) U.S. Cl. .......... 348/162; 348/216.1; 348/222.1

(58) Field of Classification Search .......... 348/162, 348/216.1, 217.1, 222.1, 234
See application file for complete search history.

(56) References Cited

U.S. PATENT DOCUMENTS

| | | | | |
|---|---|---|---|---|
| 7,199,366 B2 | 4/2007 | Hahn et al. | | 250/330 |
| 7,536,012 B1 | 5/2009 | Meyers et al. | | 380/44 |
| 7,847,234 B2 * | 12/2010 | Meyers et al. | | 250/225 |
| 8,053,715 B2 * | 11/2011 | Meyers et al. | | 250/208.1 |
| 2007/0019200 A1 | 1/2007 | Freeling | | 356/450 |
| 2007/0165233 A1 | 7/2007 | Freeling | | 356/450 |
| 2009/0194702 A1 | 8/2009 | Meyers et al. | | 250/393 |

FOREIGN PATENT DOCUMENTS
EP    2058677    5/2009

OTHER PUBLICATIONS

Y. Shih, "The Physics of Ghost Imaging", arXiv:0805.1166v5 (Sep. 29, 2009).
Y. Shih, "Ghost Imaging", SPIE Newsroom, Jul. 28, 2009: http://spie.org/x36355.xml.
B. Dume, "Quantum Camera Snaps Objects it Cannot 'See'", New Scientist, May 2008.
D. Chandler, "MIT Quantum Insights could lead to better detectors: improved efficiency could enable research, military and medical uses", MITnews, Sep. 11, 2008: http://web.mit.edu/newsoffice/2008/quantum-detect-0911.html.
M. Schirber, "Reflection of a Ghost", Physical Review, Apr. 2008: http://focus.aps.org/story/v21/st14.

* cited by examiner

*Primary Examiner* — Daniel M Pasiewicz
(74) *Attorney, Agent, or Firm* — Fitzpatrick, Cella, Harper & Scinto

(57) ABSTRACT

A hybrid image of a scene is formed by obtaining a visible light image and a quantum entanglement image of the scene. Light intensity channel information is extracted from the visible light image of the scene, and a ghost image of the scene is constructed by cross-correlating the extracted light intensity channel information with the quantum entanglement image. The visible light image is thereafter fused with the ghost image so as to form a hybrid image of the scene.

21 Claims, 4 Drawing Sheets

HYBRID IMAGING WITH VISIBLE AND QUANTUM ENTANGLEMENT IMAGES

FIELD

The present disclosure relates to enhancement of visible light images, particularly visible light images captured in low light environments.

BACKGROUND

The light sensitivity of image capture devices continues to improve, thus allowing capture of a visible light image in increasingly low light environments.

SUMMARY

Despite advances in sensor technology, however, visible light images captured in low light environments often have compromised image quality. Moreover, there are low light environments in which available light is so extremely low, that it is difficult to extract meaningful information from visible light images captured in these environments.

As described herein, the foregoing situation is addressed through the provision of a hybrid image created as a hybrid between a visible light image and a quantum entanglement image. The quantum entanglement image is used to augment and otherwise to enhance quality of a visible light image, particularly of a visible light image captured in a low light environment.

As used herein, a "quantum entanglement image" is an image captured by a quantum sensor which captures images based on entanglement between multiple photons at the quantum level. For example, a pair of photons emanating from a common source may be entangled at the quantum level, such that a change effected to one of the photons simultaneously effects a similar change to the other as well. See, for example, Y. Shih, "The Physics of Ghost Imaging", arXiv: 0805.1166v5 (29 Sep. 2009), the contents of which are incorporated herein by reference.

Thus, in an example embodiment described herein, a hybrid image of a scene is formed by obtaining a visible light image and a quantum entanglement image of the scene. Light intensity channel information is extracted from the visible light image of the scene, and a ghost image of the scene is constructed by cross-correlating the extracted light intensity channel information with the quantum entanglement image. The visible light image is thereafter fused with the ghost image so as to form a hybrid image of the scene.

By virtue of the foregoing, even in a low light environment, a visible light image of a scene can be enhanced by a quantum entanglement image, thereby augmenting and improving overall quality of the visible light image.

In further example embodiments, the visible light image is obtained by capture of a low light image of the scene using an image capture sensor such as a digital camera or the like, and the quantum entanglement image of the scene is obtained by capture using a quantum sensor. A spatial filter is applied to the quantum entanglement image of the scene, wherein the ghost image is constructed using the filtered quantum entanglement image. More refined results are obtained in embodiments which perform image registration between the light intensity channel information and the quantum entanglement image.

Example embodiments described herein further process the visible light image by extraction of color channels from the visible light image as part of the extraction of the light intensity channel from the visible light image. The color channels are thereafter recombined with the ghost image.

This brief summary has been provided so that the nature of this disclosure may be understood quickly. A more complete understanding can be obtained by reference to the following detailed description and to the attached drawings.

DETAILED DESCRIPTION

Figure 1:
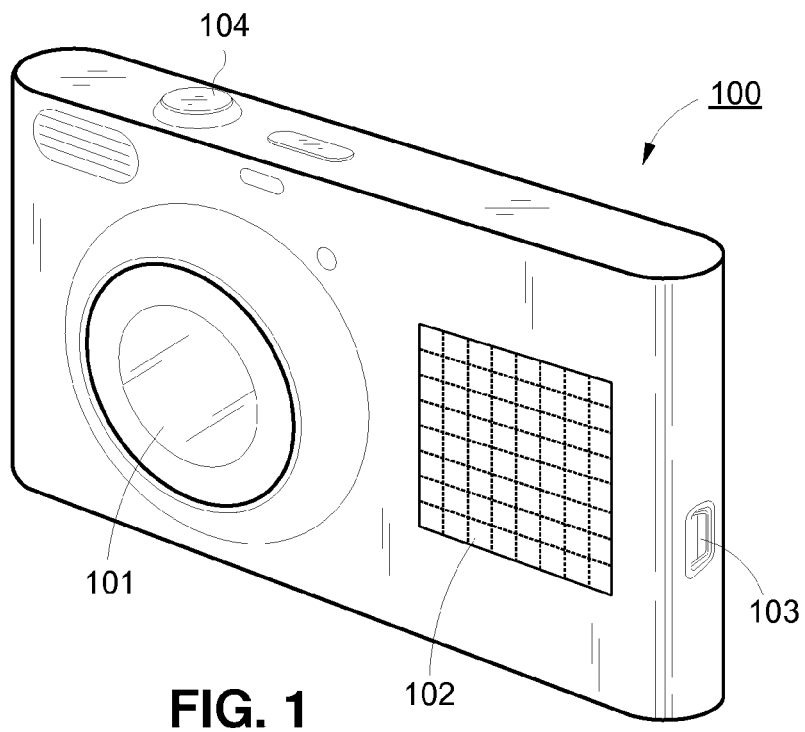
FIG. 1 is a representative view of the exterior appearance of a representative embodiment.

FIG. 1 is a representative view of the external appearance of an image processing apparatus according to a representative embodiment. As shown in FIG. 1, image processing apparatus 100 is constructed as an embedded and hand held device including a visible light image capture sensor indicated generally at 101, a quantum entanglement image sensor indicated generally at 102, and a connector 103 for connection to external devices. In the embodiment of FIG. 1, interface connector 103 is a USB interface connector, but other wired and wireless interfaces may be used.

Image processing apparatus 100 further includes a variety of user interfaces for permitting a user to interact therewith, such as shutter release 104, an unshown LCD screen for displaying menus and thumbnail images, and an unshown series of selector buttons for permitting display and selection of menu items.

Visible light image capture sensor 101 captures image data of a scene in the visible light range and/or the near-visible light range such as infrared and ultraviolet. As used herein, the visible light range corresponds to the range of wavelengths visible to the human eye, such as from about 390 to about 750 nm. Near-visible includes infrared and ultraviolet light ranges near to these wavelengths.

Quantum entanglement image sensor 102 captures a quantum entanglement image of a scene. As used herein, a "quantum entanglement image" is an image captured by a quantum sensor which captures images based on an entanglement at the quantum level between multiple photons. The aforementioned article by Shih describes two examples of quantum entanglement images, which he names "type-one" and "type-two". A type-one quantum image uses entangled photon pairs as a light source. A type-two image uses chaotic light. It should be understood that as used herein, "quantum entanglement image" refers to any image captured by a quantum sensor, which captures images based on entanglement between multiple photons at the quantum level, regardless of whether such images can correctly be termed "type-one" or "type-two" or any other type.

Figure 2:
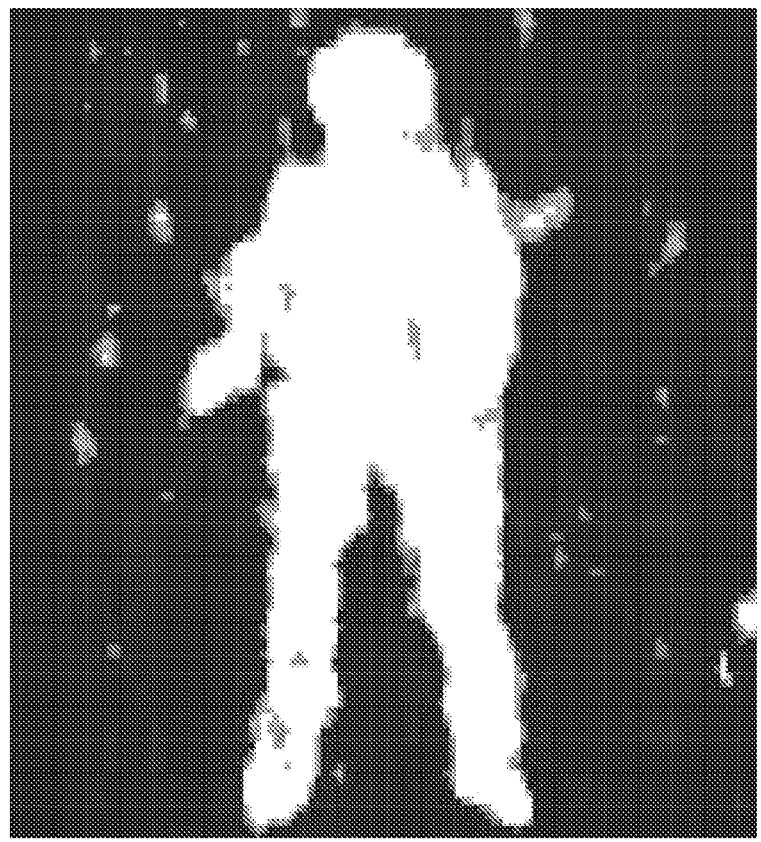
FIG. 2 is a representative view showing a quantum entanglement image.

FIG. 2 is a representative view of a quantum entanglement image, taken from the aforementioned article by Shih. The image shown in FIG. 2 is a type-two image based on chaotic radiation sources, and is an image of a toy soldier.

Figure 3:
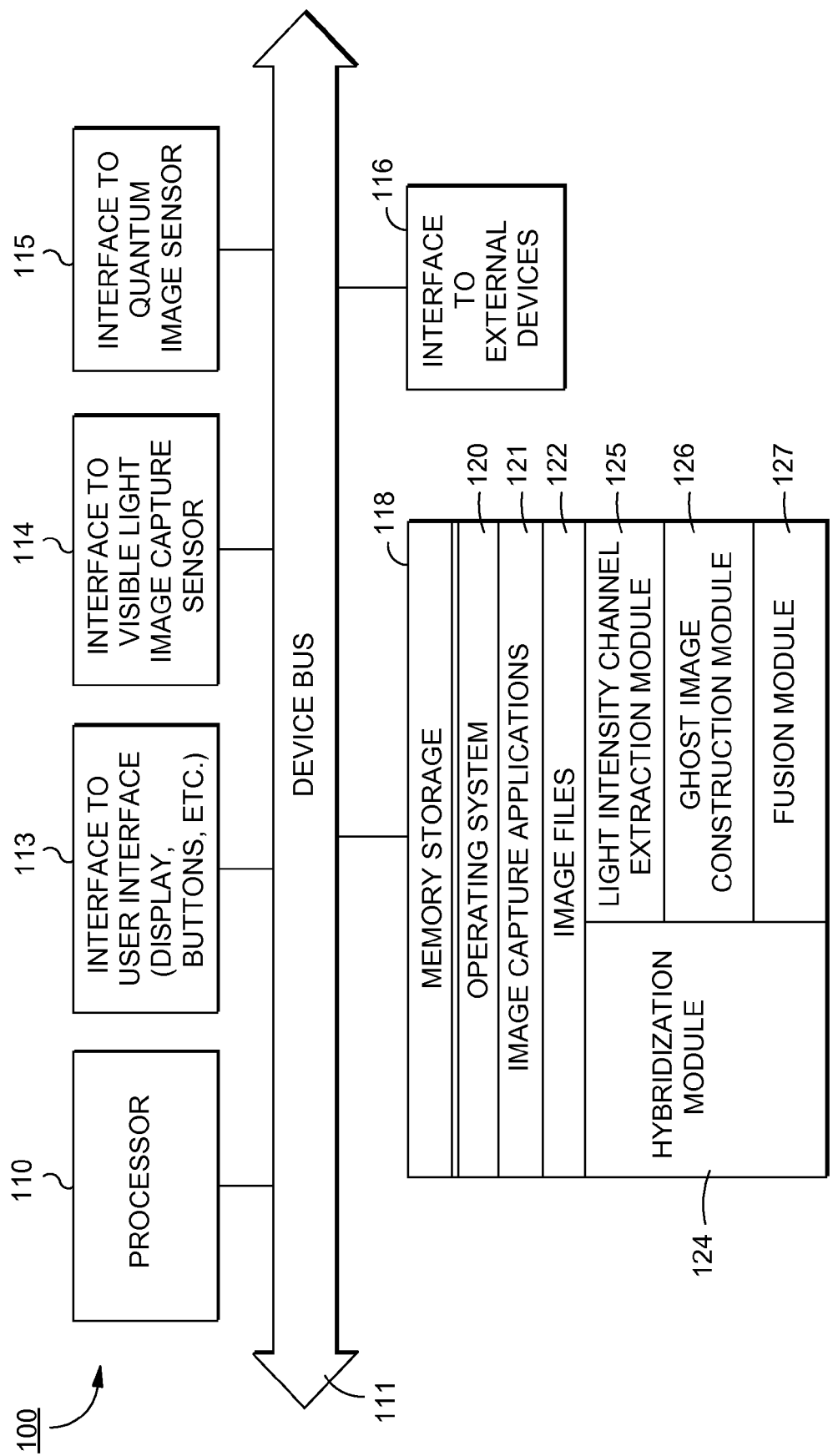
FIG. 3 is a detailed block diagram depicting the internal architecture for the representative embodiment shown in FIG. 1.

FIG. 3 is a detailed block diagram showing the internal architecture of image processing apparatus 100. As previously mentioned, image processing apparatus 100 is an embedded device, in the sense that it is designed for specific performance of a few dedicated functions in near-real-time, with a simplified architecture and with a simplified user interface. Naturally, however, non-embedded embodiments can be constructed, and indeed embodiments can be constructed with a general purpose computer programmed specifically according to the teachings herein.

As shown in FIG. 3, image processing apparatus 100 according to this embodiment includes a processor 110 which interfaces with device bus 111. Processor 110 may be a microprocessor including a multi-core or hyper-threaded processor. Also interfaced to device bus 111 are a first interface 113 to user interface devices such as shutter release 104 and the aforementioned LCD display, a second interface 114 to visible light image capture sensor 101, a third interface 115 to quantum entanglement image sensor 102, and a fourth interface 116 to interface connector 103.

A computer readable storage medium is further interfaced to device bus 111. In the embodiment of FIG. 3, the computer readable storage medium is constructed as memory 118, which may be a random access memory (RAM), a read only memory (ROM), an electrically erasable programmable ROM (EEPROM), or a combination thereof including a combination of any volatile and non-volatile memory. In addition, some embodiments may include persistent storage in the form of a disk or the like.

Stored in memory 118 are computer executable process steps for implementing an operating system 120, image capture applications 121, image files 122 including visible light images, quantum entanglement images, and hybrid images, and hybridization module 124. For its part, hybridization module 124 includes a light intensity channel extraction module 125, a ghost image construction module 126, and a fusion module 127, all of which are discussed in greater detail below.

Figure 4:
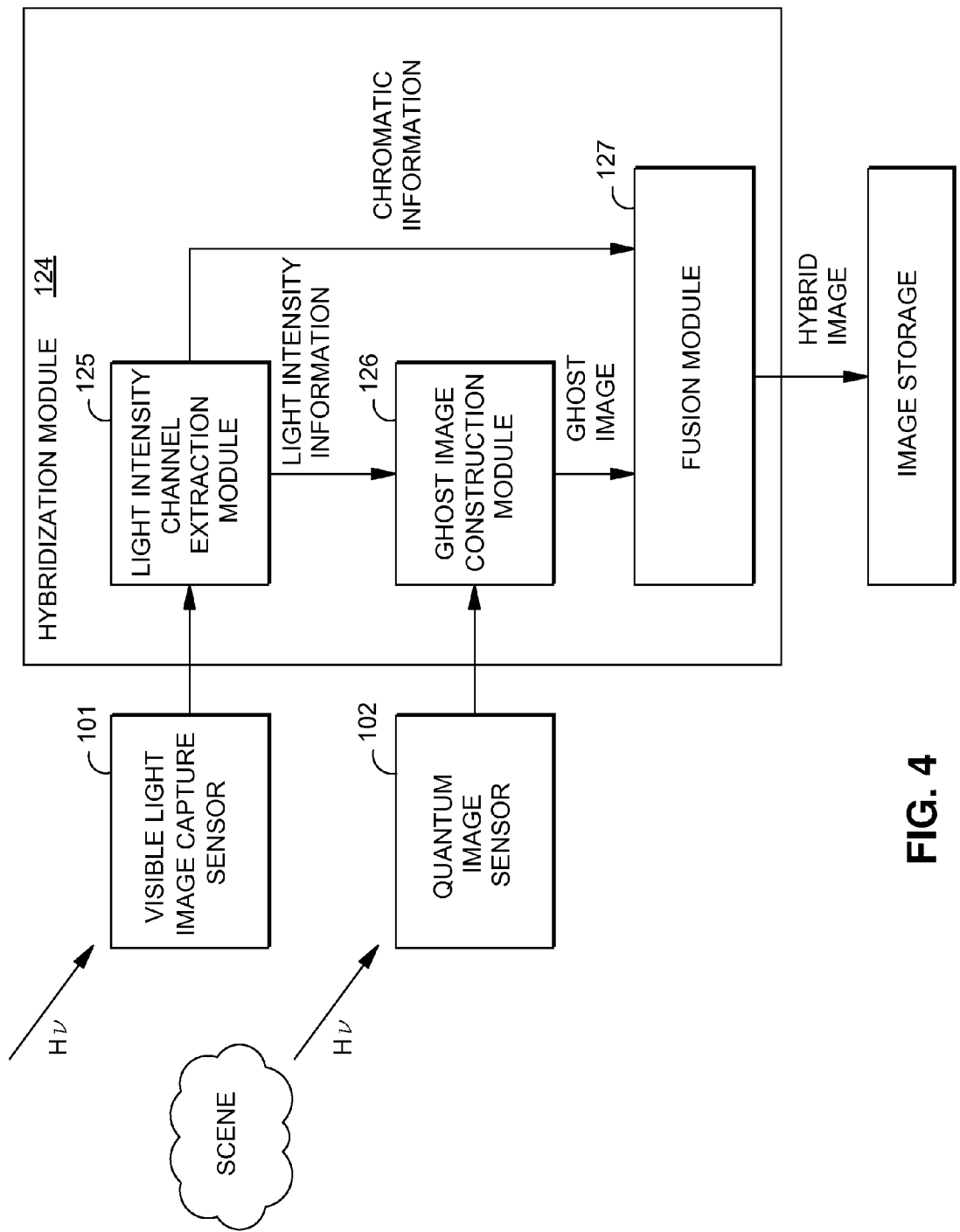
FIG. 4 is a view for explaining software architecture for a hybridization module that fuses a visible light image with a quantum entanglement image according to a representative embodiment.

FIG. 4 illustrates the architecture of hybridization module 124 according to one embodiment. As shown in FIG. 4, and as mentioned above, hybridization module 124 includes light intensity channel extraction module 125, ghost image construction module 126, and fusion module 127. Light intensity channel extraction module 125 comprises computer-executable process steps stored on computer-readable storage medium such as memory 118, and is constructed to separate light intensity information from color information of a visible light image. The light intensity information is provided to ghost image construction module 126. Ghost image construction module 126 comprises computer-executable process steps stored on computer-readable storage media such as memory 118, and is constructed to obtain a ghost image of a scene by cross-correlating extracted light intensity information with a quantum entanglement image. In this embodiment, ghost image construction module 126 is further constructed to perform additional image processing tasks relative to the quantum image and the light intensity information, such as application of a spatial filter to the quantum entanglement image of a scene, and such as image registration between the light intensity channel information and the quantum entanglement image.

Fusion module 127 comprises computer-executable process steps stored on a computer-readable storage medium such as memory 118, and is constructed to fuse chromatic information obtained from light intensity channel extraction module 125 with the ghost image obtained from ghost image construction module 126. The fused image is a hybrid image of the scene, and is stored by fusion module 127 into memory 118, such as at image files 122.

In FIG. 4 (and as well in FIG. 1), quantum image sensor 102 is depicted as if it were pointed at the scene. It should be understood that in the case of a quantum sensor, the "scene" also includes illumination since the quantum image sensor can receive not only light that was reflected/transmitted/scattered with interaction with objects, but also receive light directly from the illuminating source.

Figure 5:
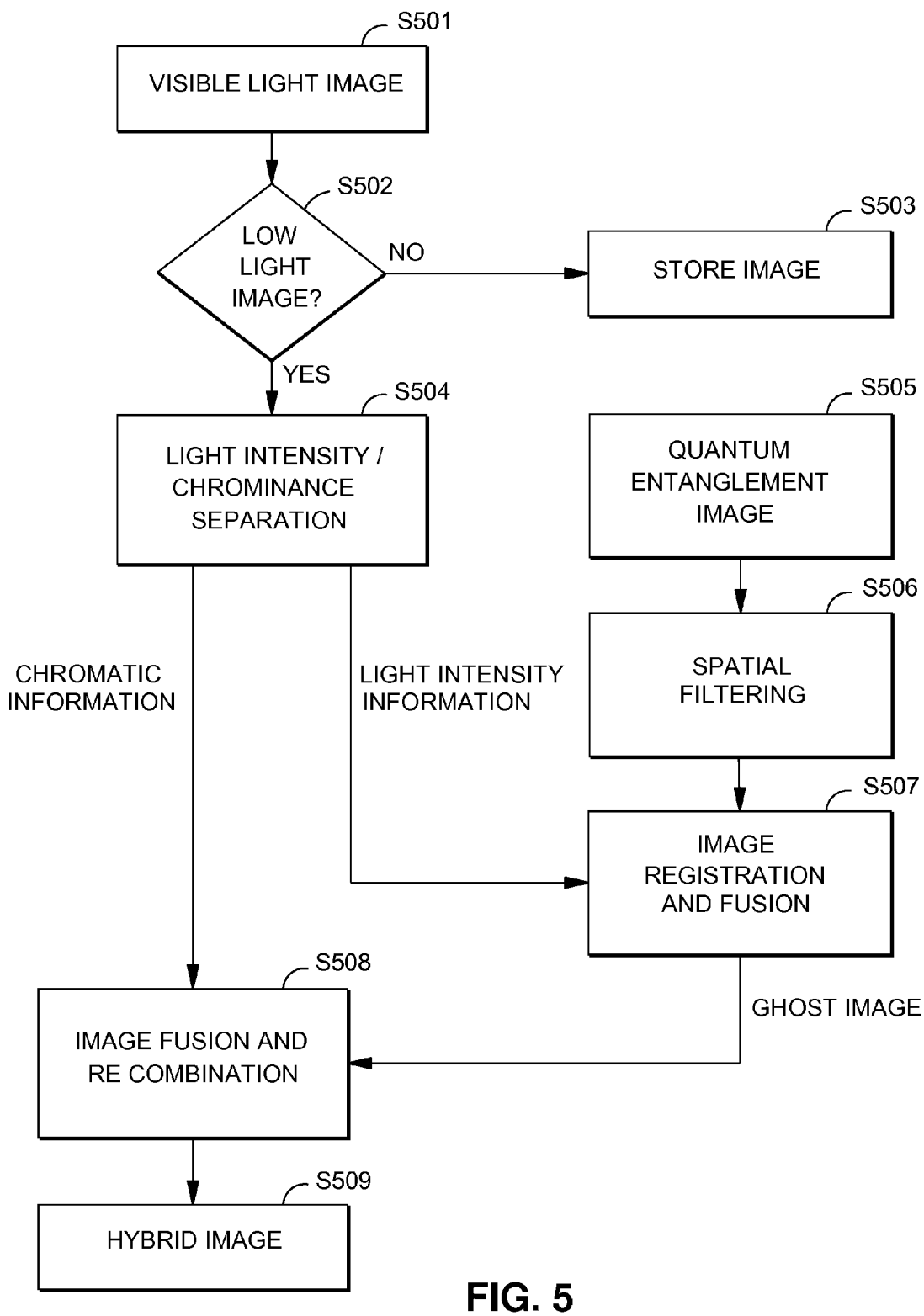
FIG. 5 is a flow diagram for explaining image fusion according to a representative embodiment.

FIG. 5 is a flow diagram for explaining image processing according to an example embodiment. The process steps shown in FIG. 5 are computer-executable process steps such as those in hybridization module 124 stored on a computer-readable storage medium such as memory 118, and are executed by processor 110 so as to implement an image processing method for forming a hybrid image of a scene. Briefly, according to the process steps as shown in FIG. 5, a visible light image and a quantum entanglement image are obtained for the scene. Light intensity channel information is extracted from the visible light image of the scene, and a ghost image is constructed for the scene, by cross-correlating the extracted light intensity channel information with the quantum entanglement image. The visible light image is fused with the ghost image, so as to form a hybrid image of the scene.

In more detail, in step S501, a visible light image of a scene is captured by visible light image capture sensor 101, responsive to user operation of shutter button 104. A determination is made in step S502 of whether the visible light image is or is not a low light image. Such a determination can be made by analysis of light intensity information in the captured image. If the visible light image is not a low light image, then the image is simply stored as shown in step S503. On the other hand, if the visible light image is a low light image, then flow advances to step S504. In other embodiments, flow might be arranged to advance to step S504 in all cases, or in cases as controlled by the user, or in combinations thereof.

In step S504, light intensity channel extraction module 124 separates light intensity information from color information in the visible light image. In more detail, visible light image sensor 101 provides visible light image data in RGB format, which does not include a light intensity channel. Thus, in step S504, a light intensity channel extraction module 125 converts each RGB pixel in the visible light image into a color space that includes a light intensity channel, such as XYZ color space that incorporates luminance or L*a*b* color space that incorporates lightness. The light intensity channel information is provided to ghost image construction module 126, and the color (chromatic) information is provided to fusion module 127, as described in more detail below.

Meanwhile, in step S505, a quantum entanglement image is obtained from quantum entanglement image sensor 102. In this embodiment, the quantum entanglement image is obtained simultaneous with capture of the visible light image, responsive to user actuation of shutter button 104. The quantum entanglement image is provided to ghost image construction module 126, which in step S506 applies spatial filtering to the quantum entanglement image. Spatial filtering is applied to remove artifacts from the quantum entanglement image, and may proceed based on application of a median filter, a morphological filter, or any other filter whose application tends to remove artifacts and otherwise improve image quality.

In step S507, ghost image construction module 126 obtains light intensity information from the light intensity channel extraction module 125, and registers the light intensity information with the filtered quantum entanglement image. Thereafter, the registered images are fused together so as to form a ghost image.

The ghost image is characterized by the light intensity channel information from the visible light image, enhanced and otherwise augmented by the quantum entanglement image. As such, the ghost image provided by ghost image construction module 126 has improved SNR (Signal to Noise Ratio) as compared with either of the visible light image and the quantum entanglement image.

The ghost image from ghost image construction module 126, and the color information from light intensity channel extraction module 125, are provided to fusion module 127, which in step S508 fuses and recombines this image so as to form a color image. In this embodiment, the L* lightness information extracted in step S504 is simply replaced by the ghost image data provided from step S507, and the resulting combination of substituted L* together with original a* b* color information is converted to RGB color space. In other embodiments, more significant processing may be performed on the ghost image, taken alone or in combination with the extracted light intensity information from step S504, such that step S508 provides superior image fusion and recombination.

The hybrid image produced in step S508 is thereafter stored at step S509, such as in memory 118. The hybrid image may be exported to an external device via interface connector 103, for display or for further processing.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. An image processing method for forming a hybrid image of a scene, comprising:
   obtaining a visible light image of the scene;
   obtaining a quantum entanglement image of the scene;
   extracting light intensity channel information from the visible light image of the scene;
   constructing a ghost image of the scene by cross-correlating the extracted light intensity channel information with the quantum entanglement image; and
   fusing the visible light image with the ghost image to form a hybrid image of the scene.

2. A method according to claim 1, wherein the visible light image is obtained by capturing a low light image of the scene with a digital camera.

3. A method according to claim 1, further comprising application of a spatial filter to the quantum entanglement image of the scene, wherein the ghost image is constructed using the filtered quantum entanglement image.

4. A method according to claim 1, wherein constructing the ghost image further comprises image registration between the light intensity channel information and the quantum entanglement image.

5. A method according to claim 1, wherein the step of fusing further comprises extraction of color channels from the visible light image and recombination of the ghost image and the extracted color channels.

6. An image processing apparatus comprising:
   an image capture sensor for capturing a visible light image of a scene;
   a quantum sensor for capturing a quantum entanglement image of the scene; and
   a hybridization module constructed to extract light intensity channel information from the visible light image of the scene, to construct a ghost image of the scene by cross-correlating the extracted light intensity channel information with the quantum entanglement image, and to fuse the visible light image with the ghost image to form a hybrid image of the scene.

7. An image processing apparatus according to claim 6, wherein the visible light image is obtained by capturing a low light image of the scene with a digital camera.

8. An image processing apparatus according to claim 6, further comprising a ghost image construction module which constructs the ghost image, and wherein the ghost image construction module is further constructed to apply a spatial filter to the quantum entanglement image of the scene, wherein the ghost image is constructed using the filtered quantum entanglement image.

9. An image processing apparatus according to claim 6, further comprising a ghost image construction module which constructs the ghost image, and wherein the ghost image construction module is further constructed to perform image registration between the light intensity channel information and the quantum entanglement image.

10. An image processing apparatus according to claim 6, further comprising a light intensity channel extraction module which extracts the light intensity information, and wherein the light intensity channel extraction module is further constructed to extract color channels from the visible light image.

11. An image processing apparatus according to claim 10, further comprising a fusion module which forms the hybrid image, and wherein the fusion module is further constructed to the ghost image and the extracted color channels so as to form the hybrid image.

12. A non-transitory computer-readable storage medium having computer-executable process steps stored thereon, wherein said process steps comprise:
   an obtaining step to obtain a visible light image of a scene;
   an obtaining step to obtain a quantum entanglement image of the scene;
   an extracting step to extract light intensity channel information from the visible light image of the scene;
   a constructing step to construct a ghost image of the scene by cross-correlating the extracted light intensity channel information with the quantum entanglement image; and
   a fusing step to fuse the visible light image with the ghost image to form a hybrid image of the scene.

13. A computer-readable storage medium according to claim 12, wherein the visible light image is obtained by capturing a low light image of the scene with a digital camera.

14. A computer-readable storage medium according to claim 12, further comprising application step of applying a spatial filter to the quantum entanglement image of the scene, wherein the ghost image is constructed using the filtered quantum entanglement image.

15. A computer-readable storage medium according to claim 12, wherein constructing the ghost image further comprises image registration between the light intensity channel information and the quantum entanglement image.

16. A computer-readable storage medium according to claim 12, wherein the step of fusing further comprises extraction of color channels from the visible light image and recombination of the ghost image and the extracted color channels.

17. Computer-executable process steps stored on a non-transitory computer-readable storage medium, wherein the process steps comprise:

code for an obtaining step to obtain a visible light image of a scene;

code for an obtaining step to obtain a quantum entanglement image of the scene;

code for an extracting step to extract light intensity channel information from the visible light image of the scene;

code for a constructing to construct a ghost image of the scene by cross-correlating the extracted light intensity channel information with the quantum entanglement image; and code for a fusing step to fuse the visible light image with the ghost image to form a hybrid image of the scene.

18. Computer-executable process steps according to claim 17, wherein the visible light image is obtained by capturing a low light image of the scene with a digital camera.

19. Computer-executable process steps according to claim 17, further comprising code for applying a spatial filter to the quantum entanglement image of the scene, wherein the ghost image is constructed using the filtered quantum entanglement image.

20. Computer-executable process steps according to claim 17, wherein constructing the ghost image further comprises image registration between the light intensity channel information and the quantum entanglement image.

21. Computer-executable process steps according to claim 17, wherein the code for fusing further comprises code for extracting color channels from the visible light image and recombining the ghost image and the extracted color channels.

* * * * *